United States Patent [19]

Pittinger, Jr.

[11] Patent Number: 4,656,739
[45] Date of Patent: Apr. 14, 1987

[54] BUMP-FEED FILAMENT VEGETATION TRIMMER

[76] Inventor: Charles B. Pittinger, Jr., 320 Cockeys Mill Rd., Reisterstown, Md. 21136

[21] Appl. No.: 753,409

[22] Filed: Jul. 10, 1985

Related U.S. Application Data

[62] Division of Ser. No. 713,147, Aug. 10, 1976, abandoned.

[51] Int. Cl.⁴ ............................................. A01D 50/00
[52] U.S. Cl. ....................................... 30/276; 56/12.7
[58] Field of Search ................ 30/276, 347; 56/12.7

[56] References Cited

U.S. PATENT DOCUMENTS

| | | | |
|---|---|---|---|
| 2,709,323 | 5/1955 | Swan | 51/335 |
| 2,713,237 | 7/1955 | Monjar | 51/335 |
| 2,771,721 | 11/1956 | Reiman | 51/335 |
| 2,854,798 | 10/1958 | DeHaven | 51/335 |
| 3,664,102 | 5/1972 | Reber | 56/295 |
| 3,859,776 | 1/1975 | Ballas et al. | 56/295 |
| 3,928,911 | 12/1975 | Pittinger | 30/276 |
| 4,077,191 | 3/1978 | Pittinger et al. | 56/12.7 |
| 4,134,204 | 1/1979 | Perdue | 30/276 |
| 4,211,004 | 7/1980 | Woods | 30/276 |
| 4,233,735 | 11/1980 | Tsuchiya | 30/276 |
| 4,524,515 | 6/1985 | Oberg | 30/276 |

*Primary Examiner*—Jimmy C. Peters
*Attorney, Agent, or Firm*—John F. McClellan

[57] ABSTRACT

A bump-actuable filament feed for vegetation trimmers; when the cutting length of filament breaks or wears short, the user without interrupting cutting simply bumps the cutting head on the ground deploying a fresh cutting-length of filament. Bumping causes a spring-restored spool latch to yield an increment of spool rotation, feeding a corresponding increment of filament from the spool. For replenishing the filament supply when exhausted, the spool snaps out in one embodiment on pressing a button, and a fresh spool as easily snaps into place.

For applications in which bumping the cutting head against the ground is not desired an analogous operation is provided by adaptation of the basic structure.

7 Claims, 12 Drawing Figures

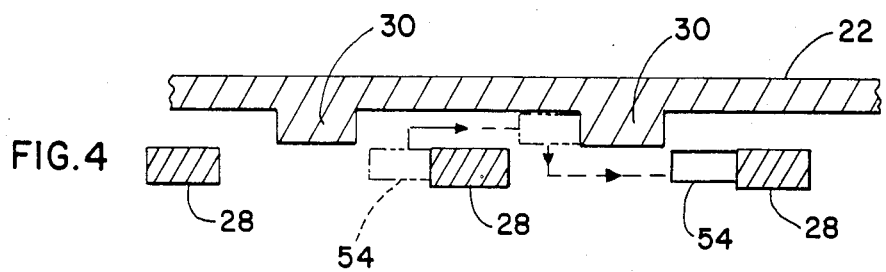
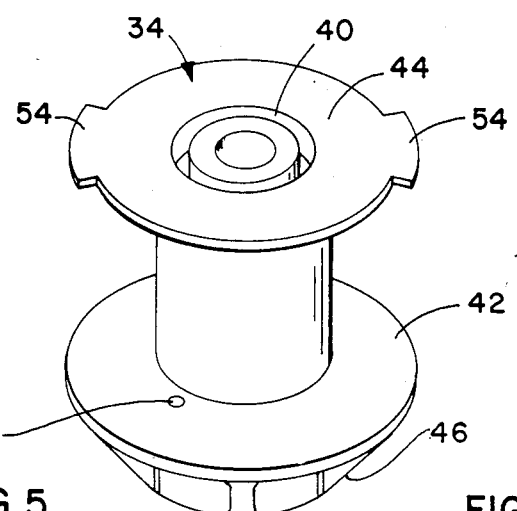
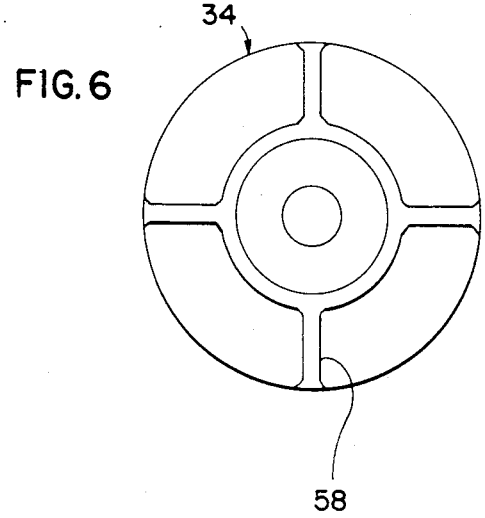
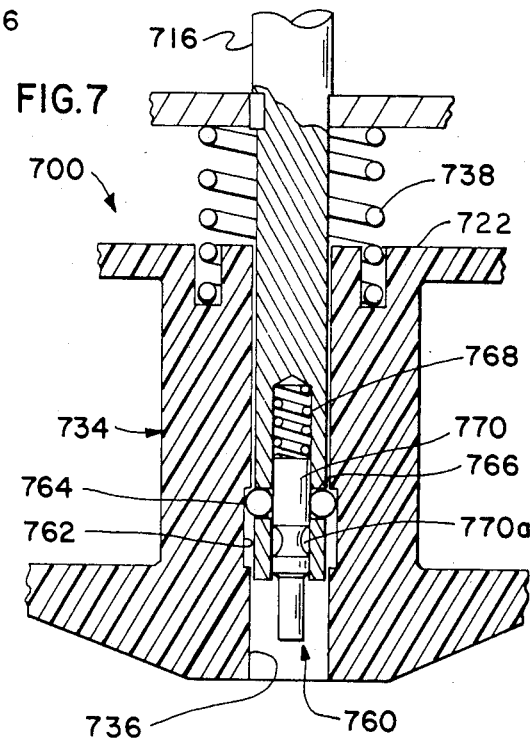

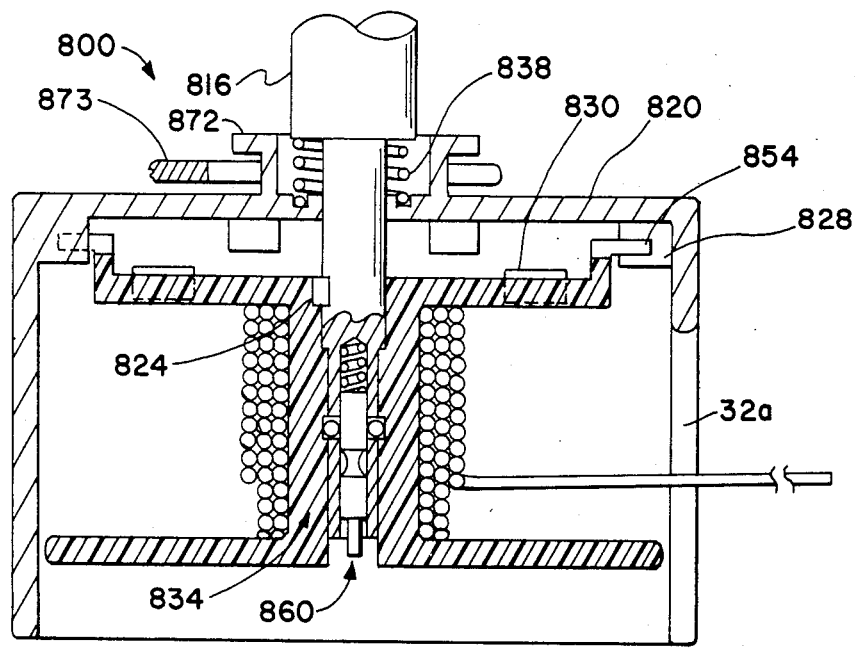
FIG. 8
FIG. 9
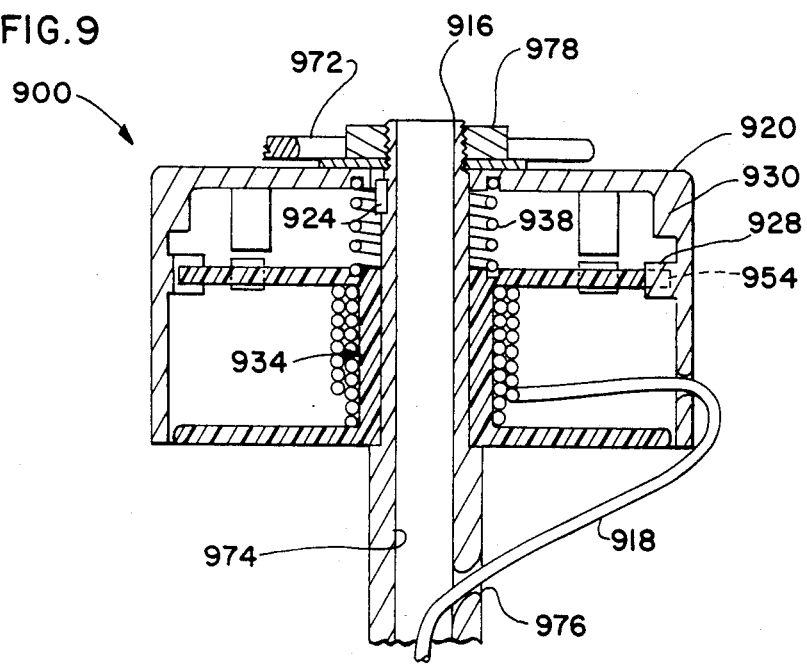

BUMP-FEED FILAMENT VEGETATION TRIMMER

This is a division of application Ser. No. 713,147 filed Aug. 10, 1976 and now abandoned.

This invention relates generally to vegetation cutting and specifically to a filament trimmer type cutter.

A principal object of the invention is to provide a spool-type supply for a filament trimmer overcoming old-art problems of feeding fresh filament from a spool. Customarily in the past it was practice to draw line from such a spool manually with bare hands after manipulation of a manual brake, and after stopping operation of the device.

However, such operation exposes the user to possible injury, and to contact with vegetation pulp which may contain injurious components such as poison ivy. In addition, work is interrupted each time a fresh length of filament is required, and the user is tempted to continue with an inefficient fragment rather than interrupt trimming for the fraction of a minute required to up-end the device and draw out a newlength of filament.

In contrast, a new cutting length of filament is deployed in a fraction of a second according to the principal object of this invention during operation and without any measuring. This user simply bumps the cutting head on the ground or otherwise to deploy a fresh cutting-length of filament, without further thought in the matter.

Further important objects are to provide a mechanism as described which is flexibly adapted through design-proportion of fixed parts to dispense large or small or intermediate length increments, which cannot overshoot, which is actuable through a variety of modes, which is applicable to a variety of types of cutter heads, eyelet, slot, hollowshaft and the like and which in embodiment provides a self-threading feature in association with the length-modulation feature.

Still further objects are to provide a mechanism as described which shields the filament on the spool during operation, and which is safe, economical, durable and simple to operate.

Yet further objects are to provide a method of feeding filament through or past a rotating guiding means in a filament trimmer which is fast, effective, safe and reliable.

The use of the term "bump" herein denotes that the invention is operable by a sudden impulse in the nature of a jar or shake.

In brief summary, given for purposes of cursive description only and not as limitation, the invention includes a filament feed actuable by a jar to feed a fresh filament cutting length.

The above and other objects and advantages of the invention will become more readily apparent on examination of the following description, including the drawings in which like reference numerals designate like parts:

FIG. 4 is a developed sectional detail taken at 4—4, FIG. 3;

FIG. 5 is an isometric view of a spool;

FIG. 6 is a bottom plan view of a spool;

FIG. 7 is a sectional elevational detail of an alternative spool mount;

FIG. 8 is a sectional elevational view of a second embodiment of the invention;

FIG. 9 is a sectional elevational detail of a third embodiment of the invention;

FIG. 1 shows a typical filament trimmer T of the hand held type, with the present invention 10 installed as a cutting head beneath it in position for filament-increment feed by bumping the ground (arrow) with the cutterhead.

Figure 1:
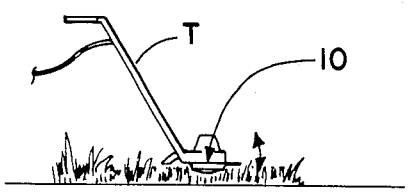
FIG. 1 is a side elevational view.
Figure 2:
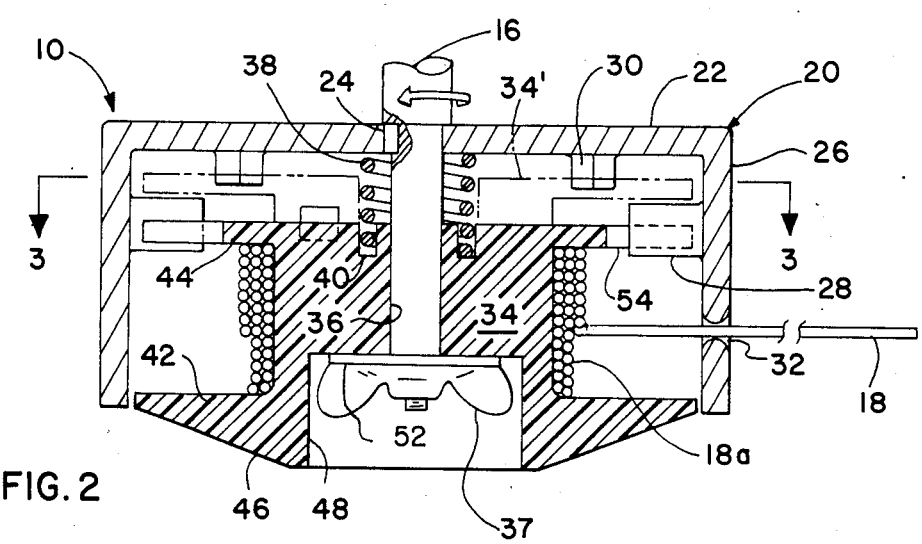
FIG. 2 is a sectional elevational view through a first embodiment of the invention.

FIG. 2 shows the invention in compact embodiment 10 as in the previous Figure connected for rotation by the driveshaft 16 of a filament trimmer so that the filament free end 18 extending from wound filament supply 18a will swing as a cutting length in a circle about the axis of the driveshaft.

THE HOUSING

Housing 20 has an inverted-cup shape with interior protrusions. The hub 22 of the housing is fitted to the driveshaft with a key or spline 24, and a cylindrical wall 26 extends down from the perimeter of the hub.

A circumferentially spaced set of fixed stops 28 protrudes radially inwardly from the wall of the housing and a set of circumferentially spaced fixed lugs 30 protrudes down from the hub in staggered relation to the stops and axially offset from them. The filament cutting length 18 protrudes outward through faired guiding aperture 32 in the housing.

THE SPOOL

The spool 34 is slidably held on the driveshaft at the bore 36 by a nut 37 against the downward bias of compression spring 38 bearing on the housing at one end and held in annular opening 40 in the spool at the other end.

Filament is wound about the spool between the lower flange 42 and the upper flange 44.

The lower flange has at the bottom an upward taper 46 and a central counterbore 48 for fastening to the end of the drive shaft, as by the wingnut and a washer 52.

The upper flange of the spool has at least one and preferably a pair of diametrically opposed spool-latching tabs 54 on a radius and at an axial position causing the tabs to rest squarely against respective fixed stops 28 in the housing.

OPERATION OF FIRST EMBODIMENT

Operation is as follows: the entire unit is rotated as a cutting head unit by the driveshaft (arrow) in cutting grass or the like with the cutting length 18 of filament. The filament supply is oppositely wound to the direction of operational rotation. During operation, when the filament becomes frayed or broken, the operator merely bumps the bottom of the unit on the ground to feed a precise increment of filament through the faired aperture 32.

Bumping slides the spool 34 upward to a position shown at 34' in phantom lines, freeing the integral spool-latching tabs from the stops 28. This instantaneously permits the centrifugal force of the cutting length of filament, and the slight slowing of rate of rotation of the spool by ground contact, to rotate the spool relative to the housing through an arc interrupted when the tabs 54 strike lugs 30. The restoring force of spring 38 then snaps the spool down to the initial level, on which the tabs rotate to a position of rest against the stops as before, but in the incrementally advanced rotational position noted. The spring force is in the direction aiding the unit to bounce back clear of the ground when bumped, and to lessen stresses of bumping.

Figure 3:
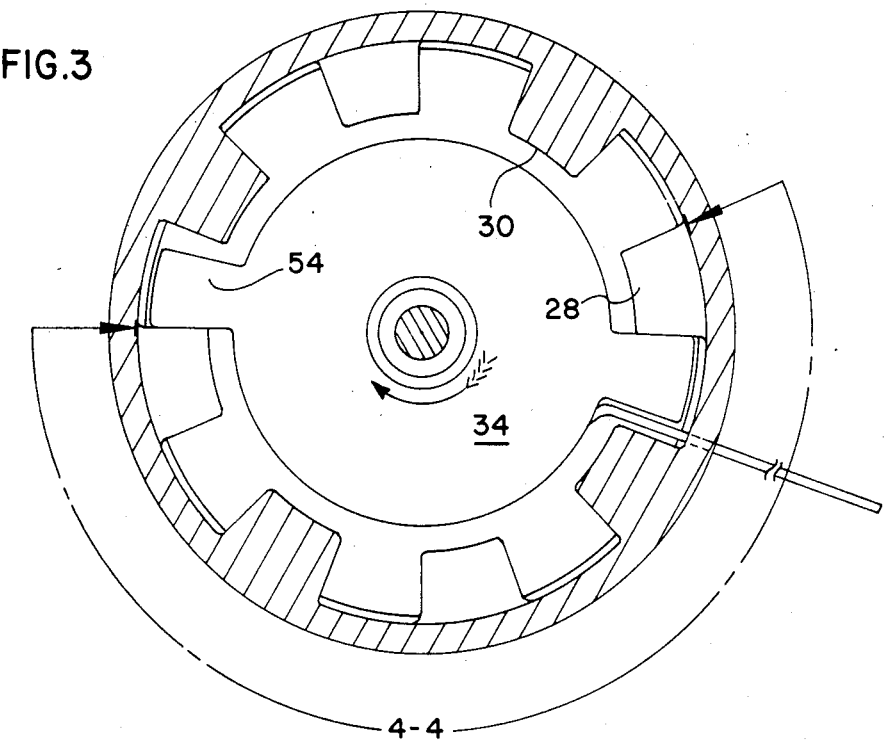
FIG. 3 is a plan view in section taken at 3—3, FIG. 1.

FIG. 3 shows in diagrammatical plan the circumferentially staggered relation of the housing fixed stops 28 and lugs 30 respectively located between the stops, with tabs 54 of the spool resting against two of the stops.

Obviously the invention offers great flexibility of feed, since the increments of feed can be large or small, depending on the number of stops and lugs provided. It is believed that most operators will be able to bump-out two increments of feed in two seconds if it is desired to provide half-length increments, for example. Obviously, at least one stop and at least one lug or equivalent and at least one tab are required for wear-and stress-reduction.

FIG. 4, a detail adapted from 4—4, FIG. 3 diagrammatically details in side elevation the path of a tab (arrows) from one position to the next in interaction of the tabs 54, stops 28 and lugs 30.

Each lug is less wide than the space between stops minus twice the tab-width to permit the tab to rise when bumped and to fall when lodged against the lug in mid-cycle of the feed.

FIG. 5 shows a spool 34 in isometric view. The spool is proferably of material that can be molded or cast such as plastic, with unitary spool-latching tabs 54, lower and upper flanges 42, 44 respectively, tapered bottom 46 to facilitate proper bumping, and annular spring groove 40 in the upper face of the upper flange. The spring groove may be tight enough to retain the spring, making one fewer separate part if a resupply of filament is to be wound on the spool by the user.

The filament is in any case secured at the inner end to the spool, any conventional means may be used for this, symbolized by hole 56 through the lower flange, through which the filament end may be run and then knotted below.

FIG. 6 shows the bottom plan view of the spool 34 as having ribs 58, which may be used, if desired to increase friction on bumping in heavy or wet grass or the like.

PUNCH-RELEASE SPOOL RETAINER

FIG. 7 illustrates in alternative embodiment 700 a punch-release mechanism 760 for snap-in/snap-out spool attachment.

The spool 734 and housing are similar to that previously described, but the spool bore 736 has an annular enlargement 762 in upwardly spaced location from the lower end of the spool.

The driveshaft 716 has opposed captive balls 764 in a transverse bore 766. A spring 768 forces a captive plunger 770 down in a coaxial hole in the shaft, forcing the balls radially outward, engaging the upper end of the annulus and retaining the spool against the urging of spring 738 compressed between the spool and hub 722.

OPERATION OF SPOOL RETAINER

To release the spool, the operator reaches upward into the bore and presses the protruding end of the plunger upward against the bias of the spring 768 until the reduced-section portion 770a of the plunger is at the level of the balls. The balls then retract into the reduced-section portion of the plunger under the urging of spring 738 as it acts through the spool on the incline of the balls, and snaps the spool free.

To install a spool is simply a matter of pushing it onto the shaft with plunger depressed after which upon release of the plunger the balls engage the annular recess in the spool and retain the spool.

In manufacture, the balls and the plunger may be retained by staking or other conventional means.

HOUSING UPWARD-ACTUATION EMBODIMENT

FIG. 8 illustrates a further embodiment 800 in which the spool 834 is fixed to the driveshaft 816 as by key 824 and punch-release mechanism 860, and the housing 820 is slidable upward on the shaft against the bias of shoulder spring 838 when bumped upward. The resultant relative motion between the spool means and housing means releases the spool-latching tabs 854, which may be constructed with upward offset as shown, to fly around under drive of the shaft, lodge against lugs 830, and advanced, relocate against stops 828 as before under restoring bias of spring 838. The exchanged locations of the lugs and stops will be evident in this embodiment.

OPTIONAL METHOD OF PUMPING

Bumping may be by means of a tap of the lower edge of the housing against the ground, be done inertially by means of a shake or it may be done through a ground-contactor handle or a fist-tapped handle which by conventional means raises circular flange 872 on top of the housing by means of a fork 873. The fork may also limit downward travel of the housing in the manner of a stop, whether or not used to lift. Fist or palm or foot bumping of a conventional lever system to raise the fork may be preferred to actuate the escapement in lawnmower installations as opposed to hand carried filament trimmer installations.

This Figure also indicates that the principle of this invention is equally applicable to slot configurations 32a in the housing, and to eyelet configurations.

HOUSING DOWNWARD-ACTUATION EMBODIMENT

FIG. 9 illustrates an embodiment 900 for a trimmer with a hollow driveshaft 916 in which the housing 920 is fixed in rotation to the driveshaft as by key 924. The filament 918 runs down the bore 974 of the driveshaft through an aperture 976 below the spool, and the housing is slidably held on the drive shaft against the upward bias of a spring 938 between spool and housing. A nut 978 on the upper end of the shaft retains the housing. The filament leads down and emerges as a cutting length at any conventional cutter head, such as a drum (not shown) with an eyelet.

OPERATION OF HOUSING DOWNWARD-ACTUATION EMBODIMENT

To actuate the filament feed of this embodiment, the housing may be bumped downward by a fork or finger 972 under any suitable pumping actuation, or may be actuated by a bump of the cutting head to release the spool and permit it to be drawn through the feeding arc.

HOLLOW-SHAFT SPOOL-LIFT ACTUATION EMBODIMENT

Figure 10:
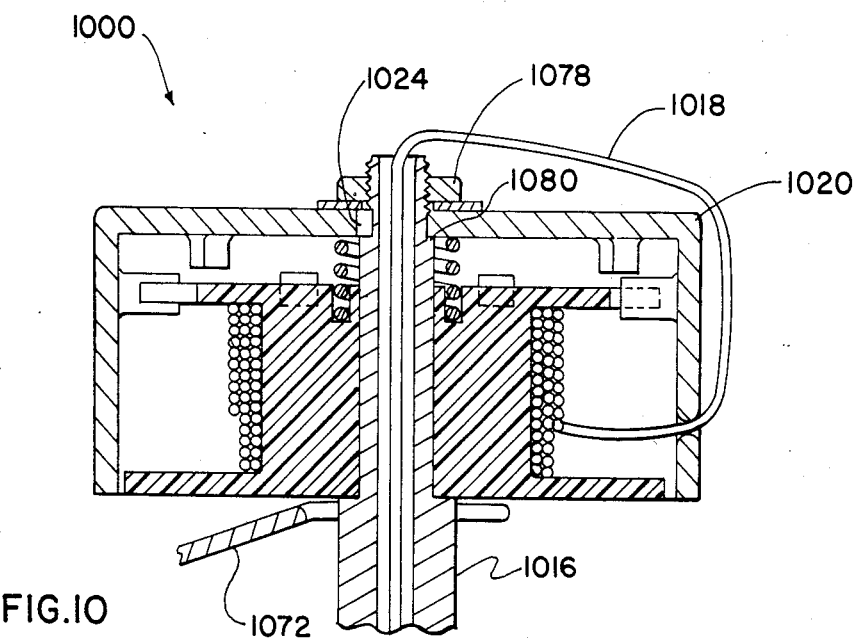
FIG. 10 is a sectional elevational detail of a fourth embodiment.

FIG. 10 illustrates an embodiment 1000 similar to that of the first-described embodiment illustrated in FIG. 2, except that the housing 1020 is fixed as by nut 1078, shoulder 1080 and key 1024 at the top of a hollow shaft filament trimmer with the filament 1018 running around the top downward through the hollow shaft 1016. The spool may be bumped upward for actuation by a fork 1072 which may be bumped up by ground contact or otherwise, by conventional type frame-attached or other linkage. A hollow shaft filament feed of different type is disclosed in U.S. Pat. No. 3,928,911 issued Dec. 30, 1975, to Charles B. Pittinger, Jr. for HOLLOW-SHAFT FEED FILAMENT TRIMMER.

Figure 11:
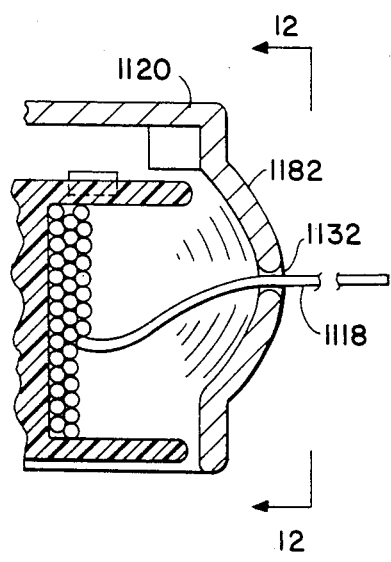
FIG. 11 is a sectional elevational detail of an alternative cup design for the invention.
Figure 12:
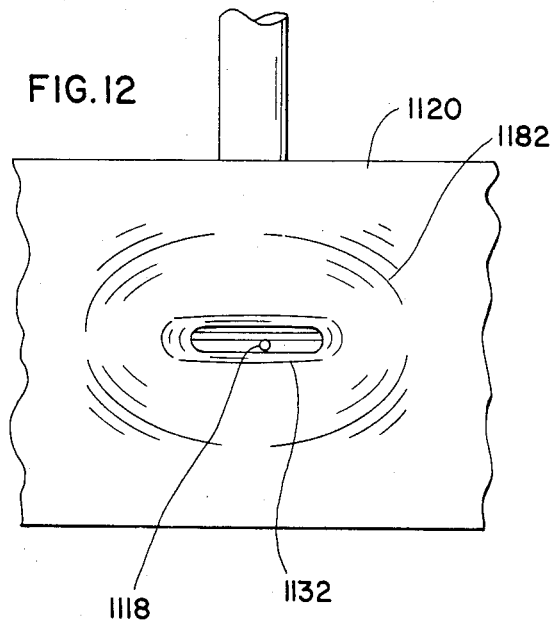
FIG. 12 is a detail viewed at 12—12, FIG. 11.

FIGS. 11 and 12 are respectively side elevational sectional detail and side elevational detail of any housing of the types described above but having an outwardly preferably elliptical convex bulge 1182 around the filament aperture, which aperture may be a circumferential slot 1132. Centrifugal force will tend to funnel a filament free end 1118 which may be snapped-off inside the housing into the slot upon bumping-feed of a filament increment, making this in effect an automatic-threading housing. Obviously if the wall is thick, a local interior concavity will serve the same function.

It will be appreciated that the driveshaft itself can be modified to serve the function of one of the elements, upper or lower, herein described, within the spirit of the invention.

It will be appreciated also that the invention can safely shield the filament wound on the spool, and that in the hollow-shaft embodiment, it offers two modes of down-the-shaft feed, both isolating the entire mechanism from the cutting head while supplying useful flywheel momentum enabling minimal structure to be employed at the cutting head, and that the various other types of operation are applicable also to this embodiment.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be secured by U.S. Letters Patent is:

1. In a filament trimmer mechanism for cutting materials including ground-growing vegetation by swinging a filament free-end as a cutting length, means for storing filament for resupplying said cutting length, and means for deploying in succession lengths from the storing means for said resupplying, the improvement comprising: the means for deploying including means responsive to impulse actuation for feeding predetermined lengths of filament, means for securing filament following said feeding, the means responsive including first means, second means, one of said first and second means including said means for storing, the other of said first and second means including means for guiding, means for positioning the first means and the second means movably relative to each other for responding to said impulse actuation, the means for positioning including a driveshaft, the first means including means for guiding a said cutting length of filament, the first means having slidable coupling for rotation with the driveshaft, the second means including said means for storing, the first means movable along the driveshaft from a first position to a second position, the means for deploying comprising means permitting rotation of the second means at said first position, the means for securing comprising means preventing rotation of the second means at said second position, means for biasing the first means toward the second position, the driveshaft being hollow and having an upper end and a lower end, the first means and the second means being toward the upper end of the driveshaft, and means providing for a said filament to extend from the second means and the guiding means through at least a portion of the driveshaft for deployment therefrom as a cutting length.

2. In a mechanism as recited in claim 1, the means providing including an aperture in the hollow shaft below the first and second means for passage of a said filament therethrough.

3. In a filament trimmer mechanism for cutting materials including ground-growing vegetation by swinging a filament free-end as a cutting length, means for storing filament for resupplying said cutting length, and means for deploying in succession lengths from the storing means for said resupplying, the improvement comprising: the means for deploying including means responsive to impulse actuation for feeding predetermined lengths of said filament, means for securing filament following said feeding, the means responsive including first means, second means, one of said first and second means including said means for storing, the other of said first and second means including means for guiding, means for positioning the first means and the second means movably relative to each other for responding to said impulse actuation, the means for positioning including a driveshaft, the first means guiding a said cutting length of filament, the second means including said means for storing, the first means having coupling for rotation with the driveshaft, the second means movable along the driveshaft from a first position to a second position, the means for deploying permitting rotation of the second means at said first position, the means for securing preventing rotation of the second means at said second position, means biasing the second means toward the second position, the driveshaft being hollow and having an upper end and a lower end, the first means and the second means being toward the upper end of the driveshaft, and means providing for a said filament to extend from the first means and the guiding means through at least a portion of the driveshaft for deployment therefrom as a cutting length.

4. In a mechanism as recited in claim 3, the means providing including a said end of the hollow shaft being open for passage of said a filament.

5. In a vegetation-cutting filament trimmer of the type having a rotatable hollow driveshaft mounting a spool concentric in a housing and filament on the spool passing from the spool through an opening in the housing into and down said hollow driveshaft for deployment from a lower portion of said hollow driveshaft as a predetermined cutting length under centrifugal force on rotation of the hollow driveshaft, the improvement comprising: the hollow driveshaft having structure defining an aperture laterally therein below said spool, and said filament passing through the aperture prior to passing as said, into and down said hollow driveshaft.

6. In a vegetation cutting filament trimmer of the type having a spool concentric in a housing, a length of rotatable hollow shaft mounting concentrically at an upper portion thereof the spool and housing, filament on the spool and passing through the housing and deployable from the hollow shaft as a cutting length of filament at a position below the spool under centrifugal force of said rotating, the improvement comprising: the hollow shaft having structure defining an aperture therein intermediate the length thereof, and the filament passing in predetermined lengths from said housing through said aperture into the hollow shaft and down to said position below the spool.

7. In a rotary filament trimmer for trimming vegetation and being of the type having: a spool, a housing around the spool concentric with the spool and a hollow shaft attached to and extending below the spool and housing, the improvement comprising: the hollow shaft being attached at an upper end thereof to the housing and rotatably attached to the spool, filament on the spool and having an end passing through an opening in the housing and down the hollow shaft for deployment as a predetermined length of vegetation trimming filament under centrifugal force on rotation of said hollow shaft, and the housing and spool together having means for releasing additional predetermined lengths of said filament for passage down the hollow shaft under centrifugal force on rotation of the hollow shaft and housing relative to said spool.

* * * * *